(12) United States Patent
Teshirogi (10) Patent No.: US 8,040,317 B2
(45) Date of Patent: Oct. 18, 2011

(54) BACKLIGHT DEVICE HAVING LEDS CONTROLLED AS A FUNCTION OF TARGET VALUES AND INFLUENTIAL EXTENT DATA

(75) Inventor: Hitoshi Teshirogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 11/983,333

(22) Filed: Nov. 8, 2007

(65) Prior Publication Data

US 2008/0112164 A1     May 15, 2008

(30) Foreign Application Priority Data

Nov. 10, 2006   (JP) ................ P2006-305857

(51) Int. Cl.
*G09G 3/36* (2006.01)
(52) U.S. Cl. ...................................... 345/102
(58) Field of Classification Search .................. 345/102; 349/61–70; 362/561
See application file for complete search history.

(56) References Cited

U.S. PATENT DOCUMENTS

2005/0135441 A1* 6/2005 Ng et al. .................. 372/29.014
2006/0221047 A1* 10/2006 Tanizoe et al. ................. 345/102

FOREIGN PATENT DOCUMENTS

| CN | 1375653 | 10/2002 |
|---|---|---|
| CN | 1721943 | 1/2006 |
| JP | 2002-344031 | 11/2002 |
| JP | 2005-71702 | 3/2005 |
| JP | 2006-31977 | 2/2006 |
| JP | 2006 171693 | 6/2006 |
| JP | 2006-303016 | 11/2006 |
| JP | 2006-524841 | 11/2006 |

* cited by examiner

*Primary Examiner* — Chanh Nguyen
*Assistant Examiner* — Ram Mistry
(74) *Attorney, Agent, or Firm* — Frommer Lawrence & Haug LLP; William S. Frommer

(57) ABSTRACT

A backlight device for applying white light to a rear face of a display panel, includes: a plurality of light sources each including a plurality of light-emitting diodes of at least three colors mounted on one surface, for emitting lights in the colors to be mixed into the white light, the light sources being divided into a plurality of unit light-emitting blocks each including a predetermined number of light sources. The device further includes a plurality of light sensors; a drive control section; and a storage section.

6 Claims, 7 Drawing Sheets

BACKLIGHT DEVICE HAVING LEDS CONTROLLED AS A FUNCTION OF TARGET VALUES AND INFLUENTIAL EXTENT DATA

CROSS REFERENCES TO RELATED APPLICATIONS

The present invention contains subject matter related to Japanese Patent Application JP 2006-305857 filed with the Japan Patent Office on Nov. 11, 2006, the entire contents of which being incorporated herein by reference.

BACKGROUND OF THE INVENTION

1. Field of the Invention

The present invention relates to a backlight device having a number of light sources, each including a plurality of light-emitting diodes of three colors or more mounted on one surface, for combining lights emitted from the light-emitting diodes into white light, and applying the white light to a rear surface of a display panel, a method of driving the backlight device, and a color image display apparatus incorporating the backlight device.

2. Description of the Related Art

Television receivers have long been CRT (Cathode-Ray Tube) television receivers since the beginning of television broadcasts. In recent years, however, thin television receivers incorporating a liquid crystal display (LCD) panel or a plasma display panel (PDP) have become mainstream television receivers. Particularly, liquid crystal display panels have become more and more popular as they can be energized with low power consumption and the cost of large-size liquid crystal display panels is lower.

Color liquid crystal display panels are mainly of the backlight design including a color liquid crystal panel having color filters combined with a backlight device for supplying illuminating light to the color liquid crystal panel. The backlight device generally employs as a light source a fluorescent lamp such as a cold cathode fluorescent lamp (CCFL) for emitting white light from a fluorescent tube. Since mercury sealed in the fluorescent tube of the CCFL is environmentally harmful, light-emitting diodes (LED) which are of high luminance, lower power consumption, and long life have begun to be used as a desirable light source in place of the CCFL.

Light-emitting diodes which have heretofore been available include red light-emitting diodes for emitting red light and green light-emitting diodes for emitting green light. In addition, blue light-emitting diodes for emitting blue light have just started to be mass-produced, so that three color primaries can now be produced by these red, green, and blue light-emitting diodes.

In backlight devices using light-emitting diodes as the light source, white light of high chromatic purity which is produced as a mixture of red light, green light, and blue light emitted respectively from the red, green, and blue light-emitting diodes is supplied to a color liquid crystal panel to provide a much wider color reproduction range than possible with the conventional CCFL light sources. If light-emitting diodes having light-emitting chips of high output capability are used as light-emitting diodes for light sources, then the backlight device has greatly improved luminance characteristics.

For details of a color liquid crystal display apparatus with red, green, and blue light-emitting diodes, reference should be made to Japanese Patent Laid-open No. 2006-171693.

The CCFL heretofore used in the backlight device for liquid crystal displays has its white color temperature which cannot be set to a desired value by the user because of structural limitations thereof. If the color temperature of a liquid crystal display is to be changed, then the cold cathode-ray tube needs to be replaced or the aperture of the liquid crystal has to be adjusted to achieve a desired white color temperature. However, it takes time and expenses to replace the cold cathode-ray tube, and adjusting the aperture of the liquid crystal to achieve a desired white color temperature results in an elimination of liquid crystal gradations which leads to a reduction in the quality of displayed images.

The liquid crystal display apparatus with red, green, and blue light-emitting diodes being used as the light sources is problematic in that the light emission of the red, green, and blue light-emitting diodes varies due to ambient temperature changes, product variations and aging, bringing the displayed light out of white balance to cause luminance and color hue variations.

Furthermore, the light-emitting diodes have their light emission characteristics suffering temperature drifts and aging even if they are energized with a constant current.

SUMMARY OF THE INVENTION

It is desirable to provide a backlight device including light-emitting diodes whose light emission is monitored by light sensors to achieve a constant luminance and chromaticity distribution at all times, a method of driving the backlight device, and a color image display apparatus incorporating the backlight device.

According to a first embodiment of the present invention, the readings of a plurality of light sensors are initially stored as reference values after the adjustment of color temperature/luminance and the adjustment of display screen uniformity. The distribution of luminances and color temperatures in a display screen can be maintained by controlling the amount of light emitted from light-emitting devices using the light sensors. If the color temperature or luminance settings are to be changed, then drive currents for divided-screen LEDs are controlled so that the readings of the light sensors will be equalized to the reference values.

According to a second embodiment of the present invention, there is provided a backlight device for applying white light to a rear face of a display panel, including a plurality of light sources each including a plurality of light-emitting diodes of at least three colors mounted on one surface, for emitting lights in the colors to be mixed into the white light, the light sources being divided into a plurality of unit light-emitting blocks each including a predetermined number of light sources, a plurality of light sensors for detecting the white light to independently detect the lights in the colors, a drive control section associated with each of the unit light-emitting blocks, for independently controlling drive currents to be supplied to the light-emitting diodes of the light sources of the unit light-emitting blocks thereby to drive the light sources, and a storage section for storing the values of detected output signals from the light sensors when the white light applied to the display panel has a predetermined chromaticity level, wherein the drive control section associated with each of the unit light-emitting blocks uses the values of detected output signals stored in the storage section as target values, and independently controls the drive currents to be supplied to the light-emitting diodes so that the values of actually detected output signals from the light sensors will be equalized to the target values.

According to a third embodiment of the present invention, there is also provided a method of driving a backlight device for applying white light to a rear face of a display panel, the backlight device including a plurality of light sources each including a plurality of light-emitting diodes of at least three colors mounted on one surface, for emitting lights in the colors to be mixed into the white light, the light sources being divided into a plurality of unit light-emitting blocks each including a predetermined number of light sources, the method including the steps of independently controlling drive currents to be supplied to the light-emitting diodes of the light sources of the unit light-emitting blocks thereby to drive the light sources, storing the values of detected output signals from a plurality of light sensors for independently detecting the lights in the colors, when the white light applied to the display panel has a predetermined chromaticity level, and using the stored values of detected output signals as target values, and independently controlling the drive currents to be supplied to the light-emitting diodes so that the values of actually detected output signals from the light sensors will be equalized to the target values.

According to a fourth embodiment of the present invention, there is further provided a color image display apparatus including a backlight device for generating white light, and a color image display panel having a rear face for being irradiated with the white light generated by the backlight device, the backlight device including a plurality of light sources each including a plurality of light-emitting diodes of at least three colors mounted on one surface, for emitting lights in the colors to be mixed into the white light, the light sources being divided into a plurality of unit light-emitting blocks each including a predetermined number of light sources, a plurality of light sensors for detecting the white light to independently detect the lights in the colors, a drive control section associated with each of the unit light-emitting blocks, for independently controlling drive currents to be supplied to the light-emitting diodes of the light sources of the unit light-emitting blocks thereby to drive the light sources, and a storage section for storing the values of detected output signals from the light sensors when the white light applied to the display panel has a predetermined chromaticity level, wherein the drive control section associated with each of the unit light-emitting blocks uses the values of detected output signals stored in the storage section as target values, and independently controls the drive currents to be supplied to the light-emitting diodes so that the values of actually detected output signals from the light sensors will be equalized to the target values.

According to a fifth embodiment of the present invention, light-emitting devices of three colors or more including R, G, B are used as light sources, and color temperatures can be set freely by changing the color outputs of R, G, B as desired.

The light-emitting devices may be disposed directly below the liquid crystal device, and the luminance levels of the respective light-emitting devices may be set freely to control the luminance distribution over the display screen.

The light emission of the light-emitting devices may be monitored by the light sensors to provide a luminance and chromaticity distribution that is constant at all times.

The above and other features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
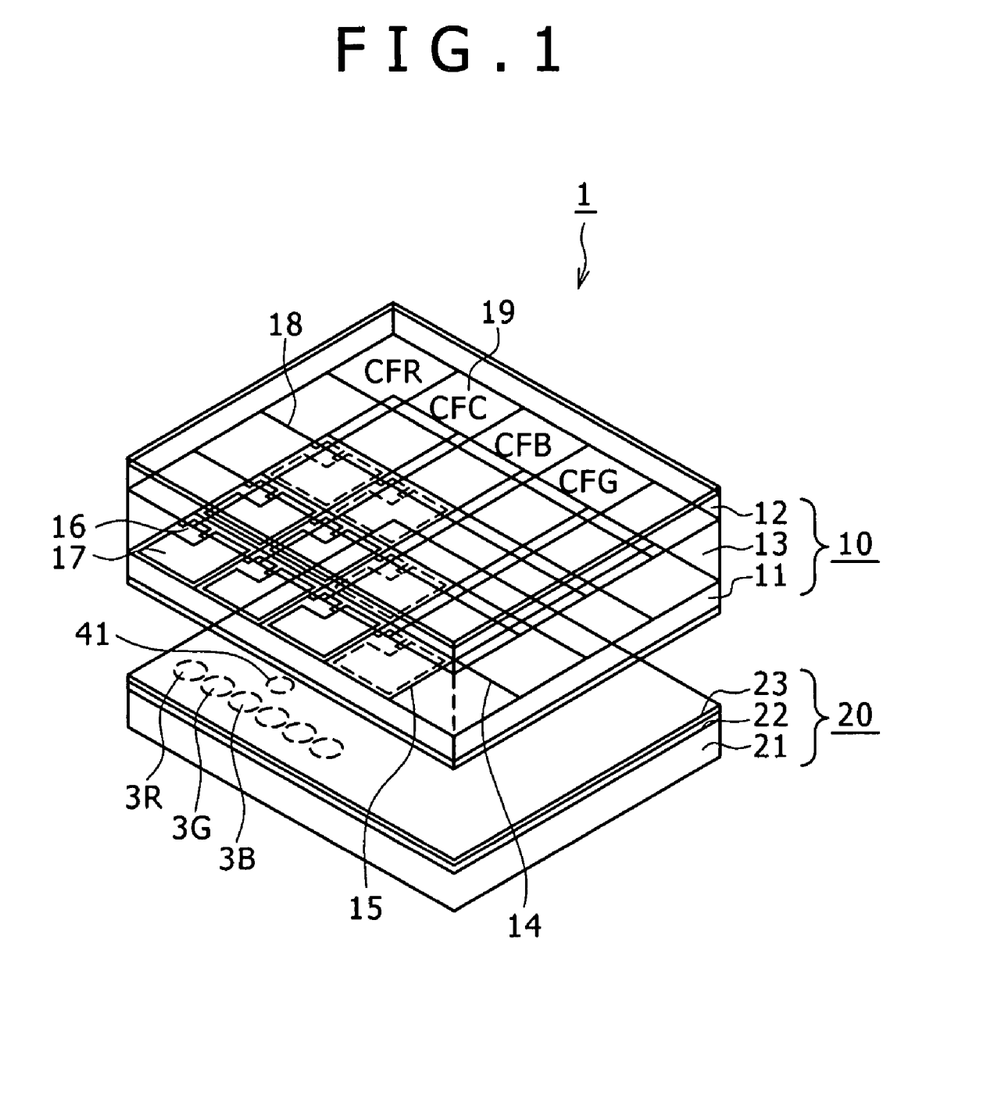
FIG. 1 is an exploded perspective view of a color image display apparatus according to one embodiment of the present invention.

The principles of the present invention are particularly useful when incorporated in a color image display apparatus 1 with a divided backlight system as shown in FIG. 1. However, the present invention is not limited to the color image display apparatus 1, but may be applicable to various other color image display apparatus without departing from the scope of the invention.

The color image display apparatus 1 is a transmissive color image display apparatus, and includes a transmissive color liquid crystal panel 10 and a backlight device 20 disposed behind the transmissive color liquid crystal panel 10.

The transmissive color liquid crystal panel 10 includes two transparent substrates of glass or the like, i.e., a TFT (Thin Film Transistor) substrate 11 and a facing electrode substrate 12 which are disposed in facing relation to each other, and a liquid crystal layer 13 with a twisted nematic (TN) liquid crystal sealed therein, which is disposed in the gap between the TFT substrate 11 and the facing electrode substrate 12. The TFT substrate 11 and the facing electrode substrate 12 are sandwiched between two polarizers.

The TFT substrate 11 includes a matrix of signal lines 14 and scanning lines 15, and a plurality of thin-film transistors 16 and pixel electrodes 17 disposed as switching elements at the crossings of the signal lines 14 and the scanning lines 15. The thin-film transistors 16 are successively selected by the scanning lines 15, and write video signals supplied from the signal lines 14 into the pixel electrodes 17. Facing electrodes 18 and color filters 19 are disposed on the inner surface of the facing electrode substrate 12 which faces the liquid crystal layer 13.

The color filters 19 are divided into a plurality of segments corresponding to respective pixels, e.g., three segments including red filters CFR, green filters CFG, and blue filters CFB which represent three color primaries, and arrayed in stripes. The color filters 19 are not limited to the striped array, but may be of a delta array, a square array, or the like.

While the rear face of the transmissive color liquid crystal panel 10 is irradiated with white light by the backlight device 20, the transmissive color liquid crystal panel 10 is energized in an active-matrix mode to display desired full-color images.

The backlight device 20 is a direct backlight device disposed behind the transmissive color liquid crystal panel 10 for irradiating the rear face of the transmissive color liquid crystal panel 10 with illuminating light emitted from a light-emitting unit 21, through a light diffuser 22 and an optical sheet group 23. The optical sheet group 23 includes a diffusion sheet, a prism sheet, a polarization conversion sheet, etc.

stacked together. The light-emitting unit 21, the light diffuser 22, and the optical sheet group 23 are housed in a light-shielded casing, not shown.

In the backlight device 20, the illuminating light emitted from the light-emitting unit 21 passes through the light diffuser 22 and the optical sheet group 23. The backlight device 10 applies the illuminating light from the optical sheet group 23 as uniform white light having predetermined optical properties to the transmissive color liquid crystal panel 10.

Specifically, the light diffuser 22 diffuses the illuminating light emitted from the light-emitting unit 21 therein to uniformize the luminance of the light for surface emission. The optical sheet group 23 directs the illuminating light emitted from the light diffuser 22 in a direction normal to the light diffuser 22 for thereby increasing the luminance for surface emission.

The backlight device 20 is an area-light backlight device having a multiplicity of light sources in the form of light-emitting diodes (LEDs) of three or more colors mounted on the same surface. Specifically, the light-emitting unit 21 includes a number of red light-emitting diodes 3R for emitting red light, a number of green light-emitting diodes 3G for emitting green light, and a number of blue light-emitting diodes 3B for emitting blue light, which are arrayed in a predetermined pattern on a mounting board. The light-emitting unit 21 mixes red light, green light, and blue light into white light and applies the white light to the rear face of the transmissive color liquid crystal panel 10.

Figure 2:
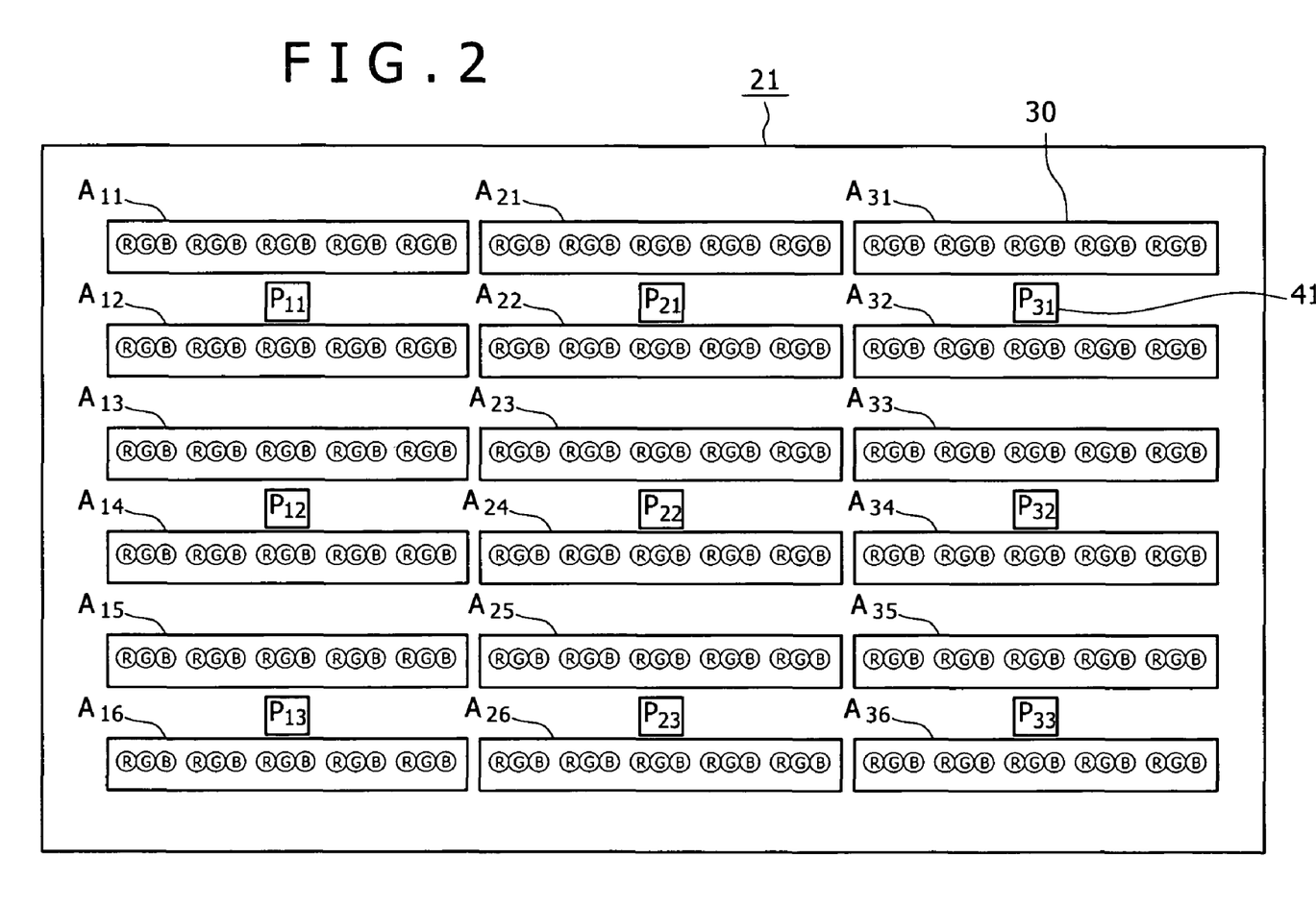
FIG. 2 is a plan view of a layout of light sources and light sensors in a light-emitting unit of a backlight device of the color image display apparatus.

As shown in FIG. 2, the light-emitting unit 21 of the backlight device 20 includes a plurality of unit light-emitting blocks 30 each including n sets of light-emitting diodes 3R, 3G, 3B, each set including a red light-emitting diode 3R, a green light-emitting diode 3G, and a blue light-emitting diode 3R. The unit light-emitting blocks 30 are arranged in a matrix of N×M corresponding to N×M divided display screen areas.

The light-emitting diodes 3R, 3G, 3B are thus arranged to mix red light, green light, and blue light emitted thereby into well-balanced white light. Insofar as the light-emitting unit 21 is capable of mixing red light, green light, and blue light in a well balanced manner, the light-emitting diodes 3R, 3G, 3B may be arranged in any layouts.

Figure 3:
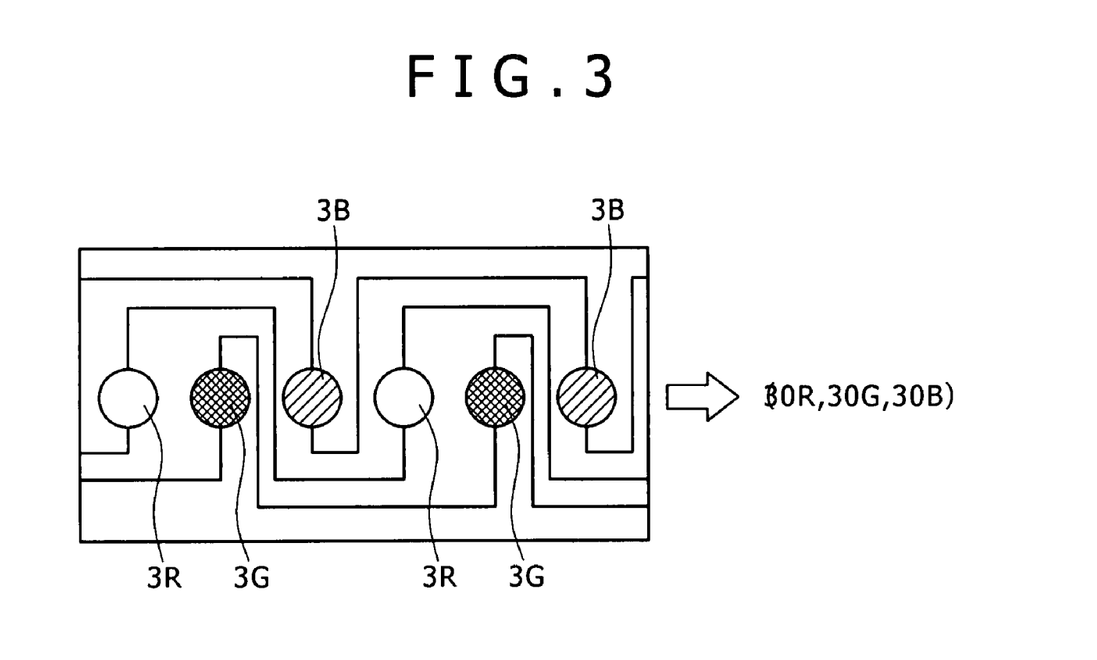
FIG. 3 is a view showing connections of light-emitting diodes of a light source in the light-emitting unit.

As shown in FIG. 3, 3n light-emitting diodes 3R, 3G, 3B of respective light sources of the unit light-emitting blocks 30 are series-connected for each color, providing a red light-emitting diode group 30R, a green light-emitting diode group 30G, and a blue light-emitting diode group 30B. Therefore, drive currents to be supplied to the red light-emitting diode group 30R, the green light-emitting diode group 30G, and the blue light-emitting diode group 30B can be controlled independently of each other.

As shown in FIG. 2, the light-emitting unit 21 includes a plurality of light sensors 41.

Figure 4:
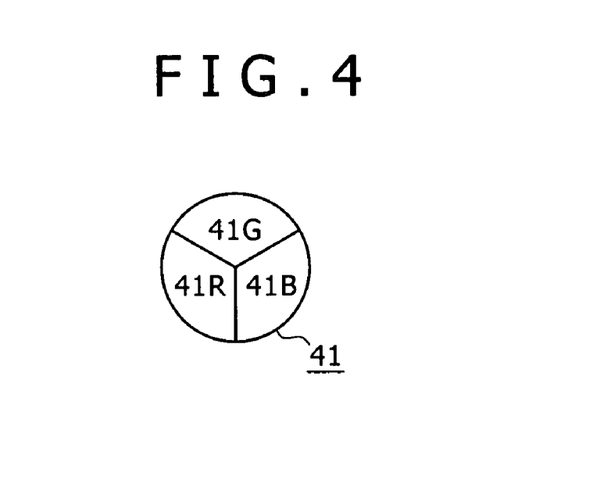
FIG. 4 is a view showing a light sensor.

The light sensors 41 serve to monitor the light emission of the light-emitting diodes 3R, 3G, 3B of the light sources of the unit light-emitting blocks 30. As shown in FIG. 4, each of the light sensors 41 includes a red light sensor 41R for detecting the amount of red light, a green light sensor 41G for detecting the amount of green light, and a blue light sensor 41B for detecting the amount of blue light. Specifically, the light sensor 41 detects white light which is a mixture of red light, green light, and blue light, and the light sensors 41R, 41G, 41B detect the red light, the green light, and the blue light, respectively, of the detected white light independently of each other. For recognizing luminance and chromaticity distributions in the display screen and automatically correcting changes in the light emission of the light-emitting diodes 3R, 3G, 3B, each of the light sensors 41 has a small monitoring area, and the number of the light sensors 41 needs to be large enough to monitor the entire display screen.

In the illustrated embodiment, the light-emitting unit 21 includes 18 unit light-emitting blocks 30 arranged in a matrix of 3×6 corresponding to 3×6 divided display screen areas. A single light sensor 41 is assigned to every two unit light-emitting blocks 30, and hence 9 light sensors 41 are arranged in a matrix of 3×3.

18 unit light-emitting diode groups which include red light-emitting diode groups 30R, green light-emitting diode groups 30G, and blue light-emitting diode groups 30B of the 18 unit light-emitting blocks 30 that are arranged in the matrix of 3×6 are denoted by A11 through A36, and the 9 light sensors 41 that are arranged in the matrix of 3×3 are denoted by P11 through P33.

Figure 5:
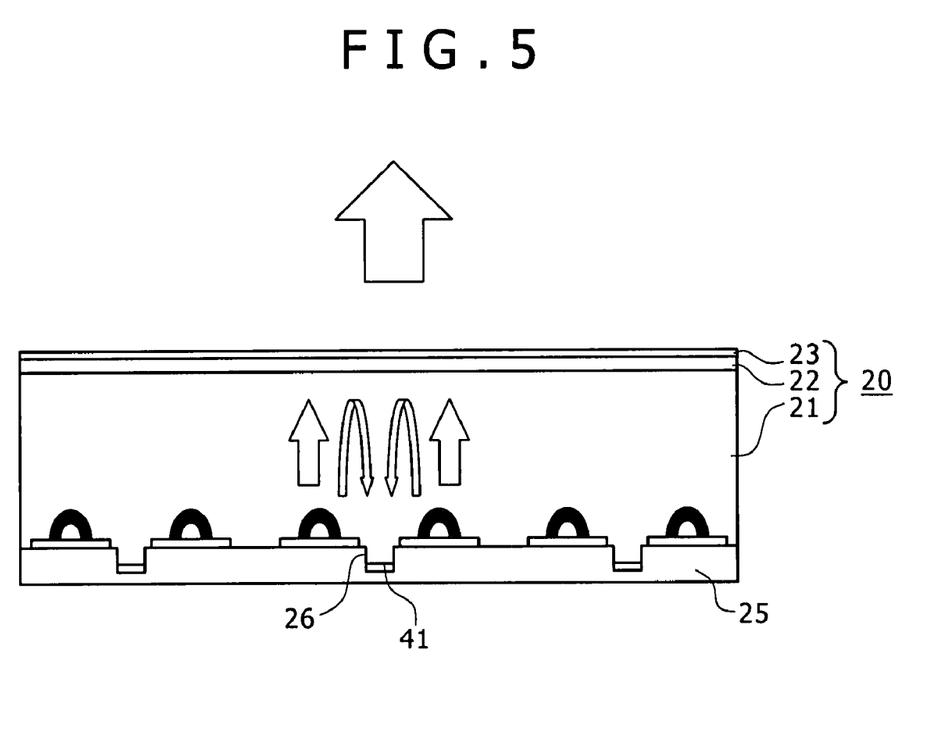
FIG. 5 is a vertical cross-sectional view of the layout of light sources and light sensors in the light-emitting unit of the backlight device.

As shown in FIG. 5, the light sensors 41 are disposed in respective recesses 26 defined in a mounting board 25 on which the light-emitting diodes 3R, 3G, 3B are mounted.

Since the light sensors 41 are disposed in the respective recesses 26, the red light, green light, and blue light emitted from light-emitting diodes 3R, 3G, 3B are not directly applied to the light sensors 41, but are reflected by the light diffuser 22 and applied as mixed light to the light sensors 41.

Figure 6:
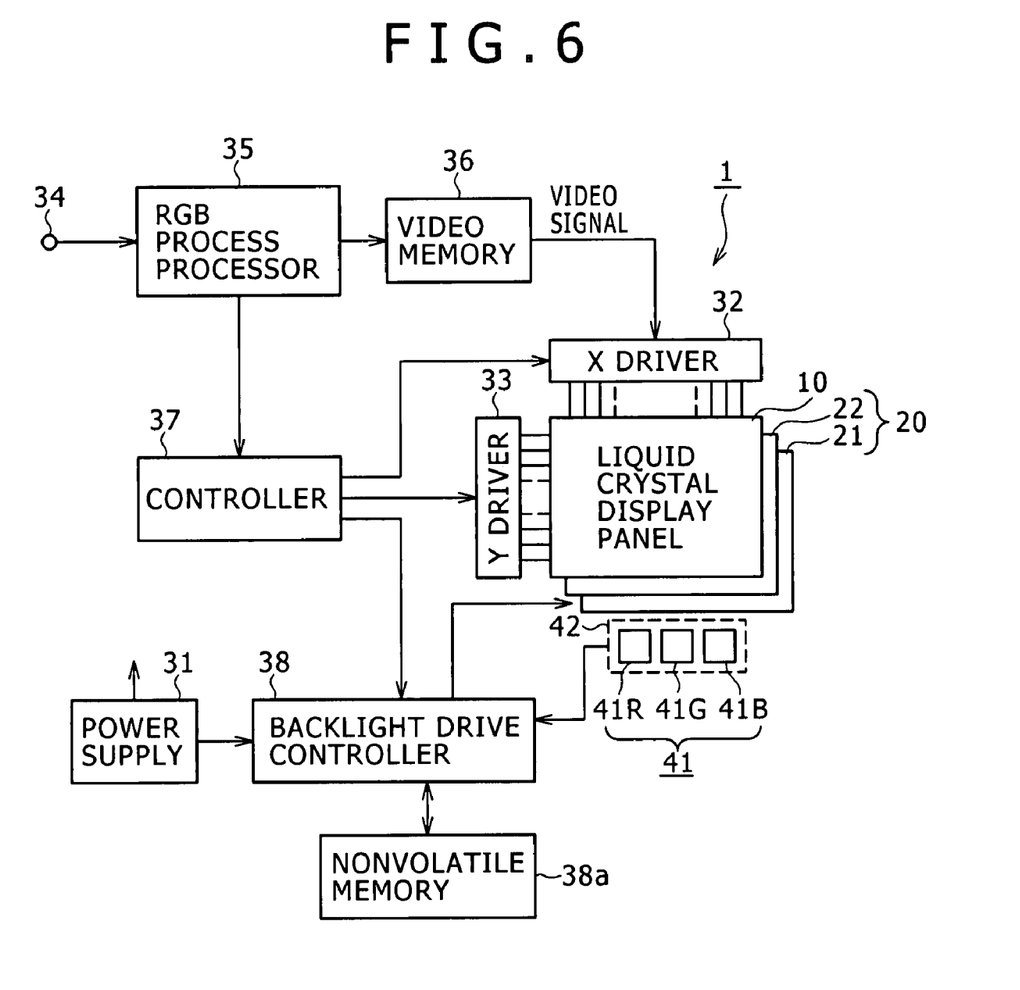
FIG. 6 is a block diagram of the color image display apparatus.

The color image display apparatus 1 is shown in block form in FIG. 6.

As shown in FIG. 6, the color image display apparatus 1 includes a power supply 31 for supplying drive electric power to the color liquid crystal panel 10 and the backlight device 20, an X driver 32 and a Y driver 33 for driving the color liquid crystal panel 10, an RGB process processor 35 for being supplied with a video signal from an external circuit through an input terminal 34, a video memory 36 and a controller 37 which are connected to the RGB process processor 35, and a backlight drive controller 38 for controlling the backlight device 20.

The RGB process processor 35 processes the video signal supplied from the input terminal 34 for chroma signal processing, etc., and also converts the composite video signal into separate R, G, B signals suitable for driving the color liquid crystal panel 10. The RGB process processor 35 supplies the separate R, G, B signals to the controller 27 and also to the X driver 32 through the video memory 36. The controller 37 controls the X driver 32 and the Y driver 33 at the timing according to the separate R, G, B signals to drive the color liquid crystal panel 10 with the separate R, G, B signals that are supplied to the X driver 32 through the video memory 36 for thereby displaying a video image depending on the separate R, G, B signals.

The backlight drive controller 38 is supplied with detected output signals from the light sensors 41 in the light-emitting unit 21. Based on the detected output signals from the light sensors 41, the backlight drive controller 38 controls drive currents for the light-emitting diodes 3R, 3G, 3R of the light sources of the light-emitting unit 21.

The backlight drive controller 38 has a nonvolatile memory 38a for storing various settings therein.

The nonvolatile memory 38a stores the values of detected output signals from the light sensors 41 at the time the white light applied to the color liquid crystal panel 10 has a predetermined chromaticity level.

Figure 7:
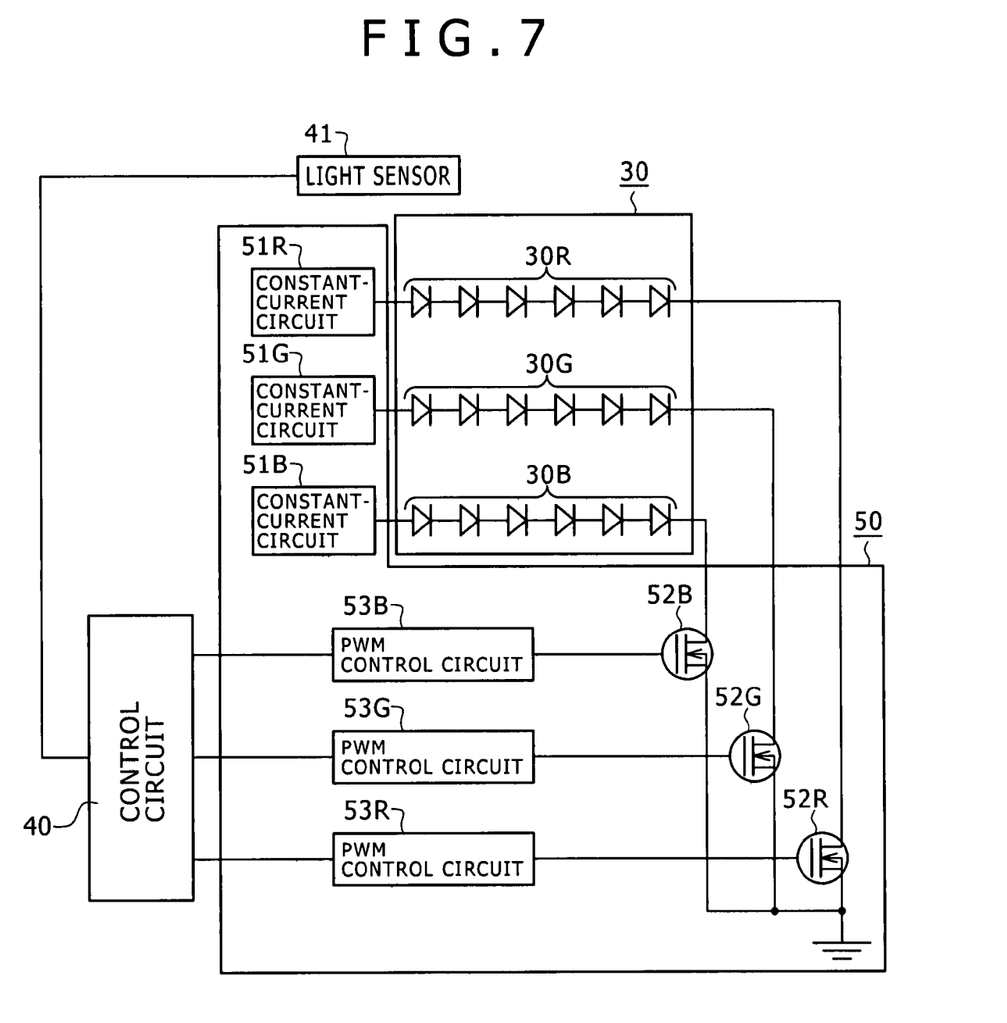
FIG. 7 is a block diagram of an LED drive circuit in a backlight controller of the backlight device.

The backlight drive controller 38 includes LED drive circuits 50 shown in FIG. 7 for driving the light-emitting diode groups 30R, 30G, 30B of the light sources of the backlight device 20. Specifically, the backlight drive controller 38 includes LED drive circuits 50 associated respectively with the unit light-emitting blocks 30. The LED drive circuits 50 are controlled by a control circuit 40 based on the detected output signals from the light sensors 41 in the light-emitting unit 21.

Since the light-emitting diodes 3R, 3G, 3B have their luminance and chromaticity characteristics variable depending on drive currents supplied thereto, the red light-emitting diode group 30R, the green light-emitting diode group 30G, and the blue light-emitting diode group 30B are driven by constant currents from respective constant-current circuits 51R, 51G, 51B. The drive currents are controlled by PWM (Pulse Width Modulation) to enable the light-emitting unit 21 to output a desired amount of light.

Specifically, the red light-emitting diode group 30R, the green light-emitting diode group 30G, and the blue light-emitting diode group 30B have anodes connected to the constant-current circuits 51R, 51G, 51B and cathodes connected to ground through FETs 52R, 52G, 52B. When PWM signals supplied from PWM control circuits 53R, 53G, 53B to the gates of the FETs 52R, 52G, 52B are turned on, the FETs 52R, 52G, 52B are turned on to connect their sources and drains to each other. Conversely, when the PWM signals are turned off, the FETs 52R, 52G, 52B are turned off to disconnect their sources and drains from each other. Therefore, when the PWM signals are turned on, the FETs 52R, 52G, 52B pass drive currents through the light-emitting diodes 3R, 3G, 3B, and when the PWM signals are turned off, the FETs 52R, 52G, 52B do not pass drive currents through the light-emitting diodes 3R, 3G, 3B. In other words, when the PWM signals are turned on, the FETs 52R, 52G, 52B enable the red light-emitting diode group 30R, the green light-emitting diode group 30G, and the blue light-emitting diode group 30B to emit red light, green light, and blue light, respectively, and when the PWM signals are turned off, the FETs 52R, 52G, 52B cause the red light-emitting diode group 30R, the green light-emitting diode group 30G, and the blue light-emitting diode group 30B to stop emitting red light, green light, and blue light, respectively.

The PWM control circuits 53R, 53G, 53B produce the PWM signals that are binary signals whose duty ratio between on and off times is adjustable. The PWM control circuits 53R, 53G, 53B are supplied with duty ratio control values (PWM values), and control the switching operation of the FETs 52R, 52G, 52B with PWM signals having duty ratios depending on the duty ratio control values (PWM values) for thereby controlling the drive currents to be supplied to the red light-emitting diode group 30R, the green light-emitting diode group 30G, and the blue light-emitting diode group 30B.

The control circuit 40 uses the values of detected output signals from the light sensors 41 which are stored in the nonvolatile memory 38a as target values. the control circuit 40 supplies duty ratio control values for equalizing the values of actually detected output signals from the light sensors 41 to the target values, to the LED drive circuits 50 associated with the respective unit light-emitting blocks 30 for independently controlling the currents to be supplied to the red light-emitting diode group 30R, the green light-emitting diode group 30G, and the blue light-emitting diode group 30B.

Figure 8:
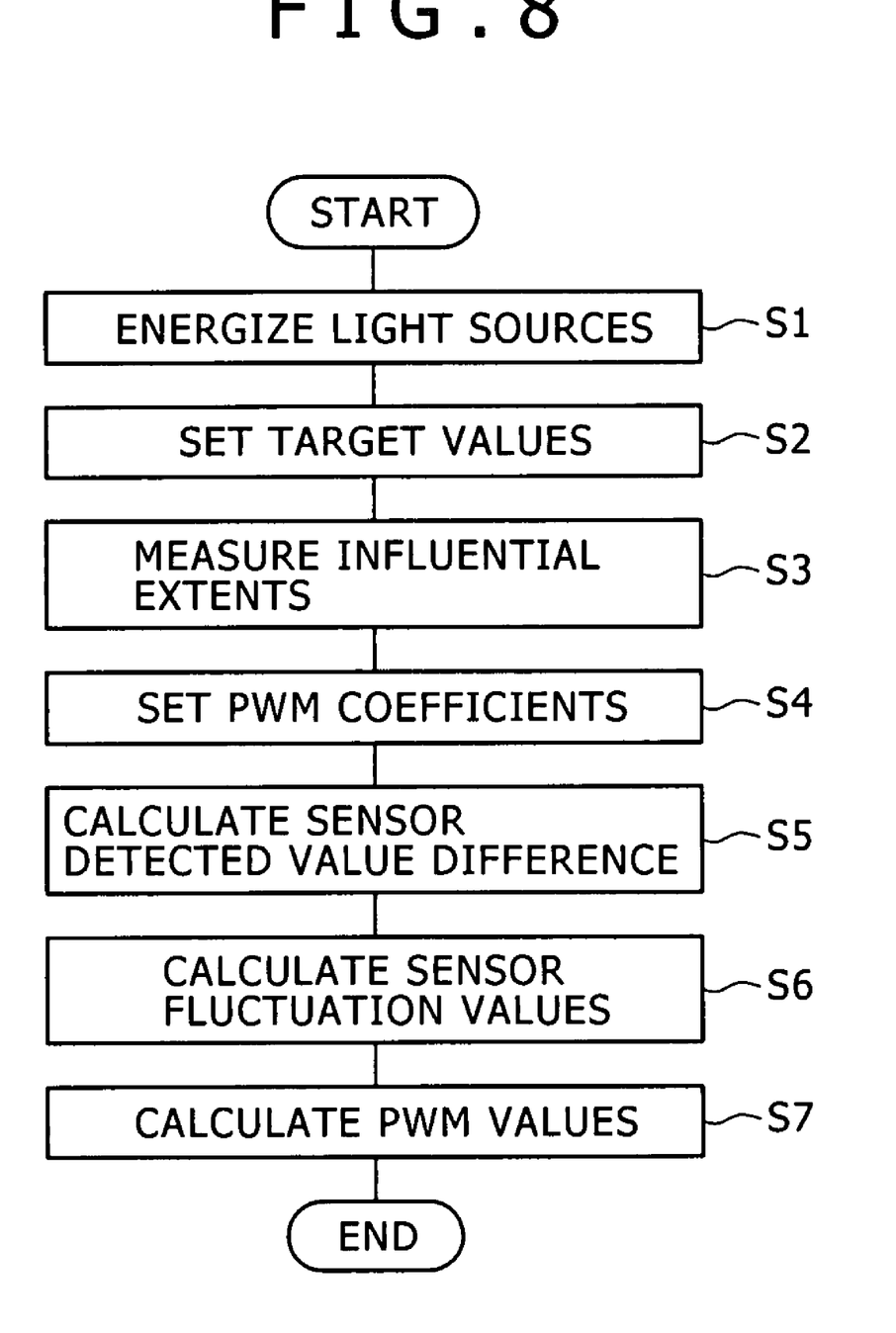
FIG. 8 is a flowchart of a processing sequence for controlling the light-emitting unit which is carried out by a controller of the backlight device.

The control circuit 40 of the backlight device 20 controls the light-emitting unit 21 according to a processing sequence shown in FIG. 8.

First, the control circuit 40 drives the light sources by independently controlling the drive currents to be supplied to the light-emitting diodes 3R, 3G, 3B of the light sources of the unit light-emitting blocks 30 by the LED drive circuits 50 associated with the respective unit light-emitting blocks 30 (step S1).

Then, the control circuit 40 sets target values for the light sensors P11 through P33 (step S2). Specifically, the control circuit 40 stores, in the nonvolatile memory 38a, all the values of detected output signals from the light sensors P11 through P33 when they independently detect color light components at sufficiently stable backlight characteristics and a predetermined chromaticity level of white light applied to the color liquid crystal display panel 10.

Then, the control circuit 40 sets influential extents that the light-emitting diode groups 30R, 30G, 30B of the unit light-emitting diode groups A11 through A36 have on the light sensors P11 through P33 (step S3). Specifically, the control circuit 40 energizes the red light-emitting diode groups 30R, the green light-emitting diode groups 30G, and the blue light-emitting diode groups 30B of the unit light-emitting diode groups A11 through A36 for each of the unit light-emitting blocks 30, measures influential extents on the light sensors P11 through P33, and stores the obtained influential extent data in the nonvolatile memory 38a. The influential extents on the light sensors P11 through P33 are determined according to:

Influential extent=detected value of light emitted when one unit light-emitting block is energized/detected value of light detected when all the unit light-emitting blocks are energized.

For example, the influential extent that the red light-emitting diode group 30R of the unit light-emitting diode group A11 has on the light sensor P11 is determined as having an inherent value of 16.3%. The control circuit 40 stores as many influential extent data as the product of the number of the light-emitting diode groups 30R, 30G, 30B and the number of the light sensors 41.

Then, the control circuit 40 sets PWM coefficients to the light-emitting diode groups 30R, 30G, 30B of the unit light-emitting diode groups A11 through A36 (step S4). Specifically, the control circuit 40 determines PWM values for incrementing the detected values of the light sensors P11 through P33 by "1". For example, it is assumed that the red light-emitting diode group 30R of the unit light-emitting diode group A11 is energized with a PWM value of "4095". If the detected value of the light sensor P11 represents "700" at this time, then the PWM coefficient is given as:

$$4095/700=5.85$$

Then, the control circuit 40 calculates variations of the detected output signals from the light sensors P11 through P33. Specifically, the control circuit 40 calculates such variations according to:

Variation=target value−present value

For example, if the detected value of the light sensor P11 is to be increased from "0" (LED not energized) to a luminance level of "2000", then the variation is calculated as:

$$Variation=2000-0=2000$$

Then, the control circuit 40 calculates variations of the detected output signals from the light sensors 41, caused by the light-emitting diode groups 30R, 30G, 30B of the unit light-emitting diode groups A11 through A36 (step S6). Specifically, the control circuit 40 determines, based on the influential extents determined in step S3, PWM values required to energize the light-emitting diode groups 30R, 30G, 30B of the unit light-emitting diode groups A11 through A36 in order to increment the detected values of the light sensors P11 through P33 by desired values. For example, based on the influential extent determined in step S3, a PWM required to energize the light-emitting diode group 30A of the unit light-emitting diode group A11 in order to increment the detected value of the light sensor P11 by "2000" is calculated as follows:

2000×0.163=326

Then, the control circuit 40 calculates PWM values for the light-emitting diode groups 30R, 30G, 30B of the unit light-emitting diode groups A11 through A36 (step S7). Specifically, the control circuit 40 calculates a variation according to:

PWM value=varied PWM value for each light-emitting diode group+present PWM value For example, a PWM value for the light-emitting diode group 30A of the unit light-emitting diode group A11 in order to increment the detected value of the light sensor P11 by "326" is calculated as follows:

326×5.85=1907

Present value "0"+variation "1097"=1907

Based on the above calculations, the PWM value "1907" is set for the light-emitting diode group 30A of the unit light-emitting diode group A11.

According to the above processing sequence, PWM values are set and applied for the light-emitting diode groups 30R, 30G, 30B of the unit light-emitting diode groups A11 through A36 with respect to the light sensor P11.

Then, PWM values are set and applied for the light-emitting diode groups 30R, 30G, 30B of the unit light-emitting diode groups A11 through A36 with respect to the light sensor P12.

Then, PWM values are set and applied for the light-emitting diode groups 30R, 30G, 30B of the unit light-emitting diode groups A11 through A36 with respect to the other light sensors up to the light sensor P33.

Now, one cycle of feedback is completed.

The control circuit 40 continues to perform the feedback process until the detected values of the light sensors P11 through P33 reach the target values set in step S2. Even after the target values are reached, the control circuit 40 monitors the detected values to see if the detected values deviate from the target values or not.

The target value setting process in step S2 and the influential extent setting process in step S3 may be performed only once in an adjustment process at the time the backlight device 20 is manufactured. When the completed backlight device 20 is used, the processing from step S4 to step S7 is repeated to equalize the detected values of the light sensors P11 through P33 to the target values set in step S2 according to the feedback process.

The backlight device 20 adjusts color temperature/luminance and display screen uniformity at the same time, using the light sensors 41.

Since the light-emitting diodes 3R, 3G, 3B have their light emission characteristics suffering temperature drifts and aging even if they are energized with a constant current, drive currents for the light-emitting diodes 3R, 3G, 3B need to be set based on the readings of the light sensors 41. The backlight device 20 initially stores the readings of the light sensors 41 as reference values after the adjustment of color temperature/luminance and the adjustment of display screen uniformity. If the color temperature or luminance settings are to be changed, then the drive currents for the divided-screen LEDs are controlled so that the readings of the light sensors 41 will be equalized to the reference values.

As described above, the backlight device 20 uses light-emitting devices of three colors or more including R, G, B as light sources, and can set color temperatures freely by changing the color outputs of R, G, B as desired. The light-emitting devices may be disposed directly below the liquid crystal device, and the luminance levels of the respective light-emitting devices may be set freely to control the luminance distribution over the display screen. The light emission of the light-emitting devices may be monitored by the light sensors 41 to provide a luminance and chromaticity distribution that is constant at all times.

Since the backlight device 20 determines a color temperature by itself, the liquid crystal display apparatus can freely select a color temperature without impairing the dynamic range of the liquid crystal. As the light sources with a plurality of controllable elements are disposed in the display screen, the distribution of luminances and color temperatures can freely be set in the display screen. The distribution of luminances and color temperatures in the display screen can be maintained by controlling the amount of light emitted from the light-emitting devices using the light sensors 41.

A combination of screen-divided LED backlight control, regardless of whether it is of either the direct or edge light type, and a plurality of corresponding light sensors may be employed.

Although a certain preferred embodiment of the present invention has been shown and described in detail, it should be understood that various changes and modifications may be made therein without departing from the scope of the appended claims.

What is claimed is:

1. A backlight device for applying white light to a rear face of a display panel, comprising:
   a light-emitting unit comprised of a plurality of light blocks, each light block including a plurality of sets of different color light-emitting diodes (LEDs), each set emitting at least three respective colors to be mixed into white light, said light blocks being mounted on a surface of a mounting board;
   a plurality of light sensors for detecting the white light and to independently detect the respective lights emitted by said LEDs in said light blocks;
   drive control means associated with each of said unit light blocks, for independently controlling drive currents supplied to the LEDs of the respective colors in a set of LEDs in the associated light block thereby to drive said LEDs in said plurality of light blocks; and
   storage means for storing the values of detected output signals from said light sensors when the white light applied to said display panel has a predetermined chromaticity level and for storing influential extent data representing the value of the detected output signal from a respective light sensor in response to light emitted from one of said light blocks divided by the value of the detected output signal from said respective light sensor in response to light emitted by all of said light blocks,
   wherein said drive control means associated with each of said unit light blocks uses the values of detected output signals, stored in said storage means as target values, and the stored influential extent data to independently control the drive currents supplied to said LEDs so that the values of actually detected output signals from said light sensors approach said target values.

2. The backlight device according to claim 1, wherein said light sensors are associated respectively with said unit light blocks, and are disposed in respective recesses defined in said mounting board on which said LEDs are mounted.

3. The backlight device according to claim 1, wherein said drive control means controls the amount of light emitted by said LEDs according to a Pulse Width Modulation control process, and adjusts the duty ratio of pulse width modulated drive currents supplied to said LEDs.

4. A method of driving a backlight device for applying white light to a rear face of a display panel, said backlight device including a plurality of light blocks, each light block including a plurality of sets of different color light-emitting diodes (LEDs), each set emitting at least three respective colors to be mixed into white light, said light blocks being mounted on a surface of a mounting board, said method comprising the steps of:

independently controlling drive currents supplied to the LEDs of the respective colors in a set of LEDs in the associated light block thereby to drive said LEDs in said plurality of light blocks;

storing the values of detected output signals from a plurality of light sensors for independently detecting the lights in the colors when the white light applied to said display panel has a predetermined chromaticity level and for storing influential extent data representing the value of the detected output signal from a respective light sensor in response to light emitted from one of said light blocks divided by the value of the detected output signal from said respective light sensor in response to light emitted by all of said light blocks; and using the stored values of detected output signals as target values, and the stored influential extent data to independently control the drive currents supplied to said LEDs so that the values of actually detected output signals from said light sensors approach said target values.

5. The method according to claim 4, further comprising the step of controlling the amount of light emitted by said LEDs according to a Pulse Width Modulation control process, and adjusting the duty ratio of pulse width modulated drive currents supplied to said LEDs.

6. A color image display apparatus comprising:

a backlight device for generating white light; and a color image display panel having a rear face for being irradiated with the white light generated by said backlight device, said backlight device including a light-emitting unit comprised of a plurality of light blocks, each light block having a plurality of sets of different color light-emitting diodes (LEDs), each set emitting at least three respective colors to be mixed into white light, said light blocks being mounted on a surface of a mounting board, a plurality of light sensors for detecting the white light and to independently detect the respective lights emitted by said LEDs in said light blocks, drive control means associated with each of said unit light blocks, for independently controlling drive currents supplied to the LEDs of the respective colors in a set of LEDs in the associated light block thereby to drive said LEDs in said plurality of light blocks, and storage means for storing the values of detected output signals from said light sensors when the white light applied to said display panel has a predetermined chromaticity level and for storing influential extent data representing the value of the detected output signal from a respective light sensor in response to light emitted from one of said light blocks divided by the value of the detected output signal from said respective light sensor in response to light emitted by all of said light blocks;

wherein said drive control means associated with each of said unit light blocks uses the values of detected output signals stored in said storage means as target values, and the stored influential extent data to independently control the drive currents supplied to said LEDs so that the values of actually detected output signals from said light sensors approach said target values.

* * * * *